United States Patent
Kwon et al.

(10) Patent No.: US 7,440,757 B2
(45) Date of Patent: Oct. 21, 2008

(54) HANDOVER METHOD IN A WIRELESS COMMUNICATION SYSTEM

(75) Inventors: Jae-Woo Kwon, Suwon-si (KR); Jung-Shin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 429 days.

(21) Appl. No.: 11/343,358

(22) Filed: Jan. 31, 2006

(65) Prior Publication Data

US 2006/0172738 A1    Aug. 3, 2006

(30) Foreign Application Priority Data

Jan. 31, 2005    (KR)    ........... 10-2005-0008845

(51) Int. Cl.
*H04Q 7/20*    (2006.01)
(52) U.S. Cl. ................ 455/436; 455/442; 370/331
(58) Field of Classification Search ........... 455/436, 455/437, 438, 439, 442, 403, 550.1, 561; 370/331, 332, 335
See application file for complete search history.

(56) References Cited

U.S. PATENT DOCUMENTS

| | | | | |
|---|---|---|---|---|
| 5,432,843 | A * | 7/1995 | Bonta | 455/438 |
| 5,794,149 | A * | 8/1998 | Hoo | 455/438 |
| 5,956,641 | A * | 9/1999 | Bruckert et al. | 455/442 |
| 5,982,758 | A * | 11/1999 | Hamdy | 370/331 |
| 6,195,552 | B1 * | 2/2001 | Jeong et al. | 455/436 |
| 6,445,924 | B1 * | 9/2002 | Rasanen | 455/437 |
| 6,990,088 | B2 * | 1/2006 | Madour | 370/331 |
| 7,155,223 | B2 * | 12/2006 | O'Brien | 455/436 |
| 2002/0048266 | A1 * | 4/2002 | Choi et al. | 370/331 |
| 2003/0104814 | A1 * | 6/2003 | Gwon et al. | 455/436 |
| 2003/0148765 | A1 * | 8/2003 | Ma et al. | 455/438 |
| 2005/0088992 | A1 * | 4/2005 | Bolin et al. | 370/329 |
| 2005/0148368 | A1 * | 7/2005 | Scheinert et al. | 455/561 |
| 2005/0266845 | A1 * | 12/2005 | Aerrabotu et al. | 455/436 |
| 2006/0068789 | A1 * | 3/2006 | Vannithamby et al. | 455/436 |

* cited by examiner

*Primary Examiner*—Jean A Gelin
(74) *Attorney, Agent, or Firm*—The Farrell Law Firm, PC (57) ABSTRACT

A handover method in a wireless communication system is disclosed. A serving base station transmits a handover request message to a base station controller in response to a handover request of a mobile station. The base station controller determines target base stations to which the mobile station can perform handover among target base stations in a list of neighbor base stations, and transmits a handover response message including the determination result information to the mobile station via the serving base station. The mobile station determines a target base station to which it will perform handover, and transmits a message indicating that it will perform handover, to the base station controller via the serving base station. The base station controller transmits a confirm message indicating that the mobile station will perform handover, to the determined target base station, and establishes a tunnel to the target base station. The mobile station registers itself in the target base station.

20 Claims, 4 Drawing Sheets

HANDOVER METHOD IN A WIRELESS COMMUNICATION SYSTEM

PRIORITY

This application claims the benefit under 35 U.S.C. § 119(a) of an application filed in the Korean Intellectual Property Office on Jan. 31, 2005 and assigned Ser. No. 2005-8845, the entire contents of which are incorporated herein by reference.

BACKGROUND OF THE INVENTION

1. Field of the Invention

The present invention relates generally to a Broadband Wireless Access (BWA) communication system, and in particular, to a system and method for providing optimized handover in a wireless communication system.

2. Description of the Related Art

Technologies generally used to provide data service to users in the current wireless communication environment are classified into the $2.5^{th}$ Generation or $3^{rd}$ Generation cellular mobile communication technology such as Code Division Multiple Access 2000 1x Evolution Data Optimized (CDMA2000 1xEVDO), General Packet Radio Services (GPRS) and Universal Mobile Telecommunication Service (UMTS), and the wireless Local Area Network (LAN) technology such as an Institute of Electrical and Electronics Engineers (IEEE) 802.11 Wireless LAN.

The local wireless access technologies have been proposed to provide high-speed data service in a wireless environment, replacing wire communication networks such as the cable modem or xDSL (Digital Subscriber Line) in hot spot areas such as public places and schools or in a home network environment.

However, when high-speed data service is provided using the wireless LAN, there are limitations in providing public network service to users due to interference as well as due to limited mobility and narrow service area.

However, the high-speed data service system, for example, IEEE 802.16, does not have a proposed handover method. Accordingly, there is a need for a handover scheme efficient in the high-speed data service system to provide improved services to users.

SUMMARY OF THE INVENTION

It is, therefore, an object of the present invention to provide an efficient handover system and method in a BWA communication system.

It is another object of the present invention to provide an optimized handover system and method capable of efficiently supporting real-time services being susceptible to a delay in a wireless communication system.

It is further another object of the present invention to provide a fast handover system and method for supporting real-time services in a wireless communication system.

According to one aspect of the present invention, there is provided a handover method in a wireless communication system. The handover method includes transmitting, by a serving base station, a handover request message to a base station controller in response to a handover request of a mobile station; determining, by the base station controller, target base stations to which the mobile station can perform handover among target base stations in a list of neighbor base stations, and transmitting a handover response message including the determination result information to the mobile station via the serving base station; determining, by the mobile station, a target base station to which it will perform handover, and transmitting a message indicating that it will perform handover, to the base station controller via the serving base station; transmitting, by the base station controller, a confirm message indicating that the mobile station will perform handover, to the determined target base station, and establishing a tunnel to the target base station; and registering, by the mobile station, itself in the target base station.

According to another aspect of the present invention, there is provided a handover method in a wireless communication system. The handover method includes upon receiving an active set request message, exchanging with target base stations, by a base station controller, information used for determining each of the target base stations whether it can accept handover of a mobile station thereto and connection information for the target base stations; transmitting, by the base station controller, an active set response message including identifiers (IDs) of base stations to which the mobile station can perform handover, to a serving base station; upon receiving a handover indication message from the mobile station, transmitting, by the serving base station, an active set indication message to the base station controller; after exchanging an active set add/drop message with the target base stations, establishing, by the base station controller, a tunnel between the base station controller and the target base station; upon receiving an anchor base station report over a channel quality information channel (CQICH), transmitting by the serving base station an anchor switching indication message to the base station controller; and upon receiving an anchor switch confirm message from the base station controller, performing communication by the target base station without a ranging procedure with the mobile station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention relates generally to a Broadband Wireless Access communication system. In particular, the present invention provides a handover scheme in the BWA communication system, for example, an IEEE802.16 system.

The present invention provides an optimized handover scheme by reducing a handover time through tunneling between a base station (BS), for example, a radio access station (RAS), and a base station controller (BSC), for example, an access control router (ACR), in performing handover in a wireless communication system.

With reference to the schematic diagram of FIG. 1, a description will now be made of an exemplary configuration of a wireless communication system to which the present invention is applicable.

Figure 1:
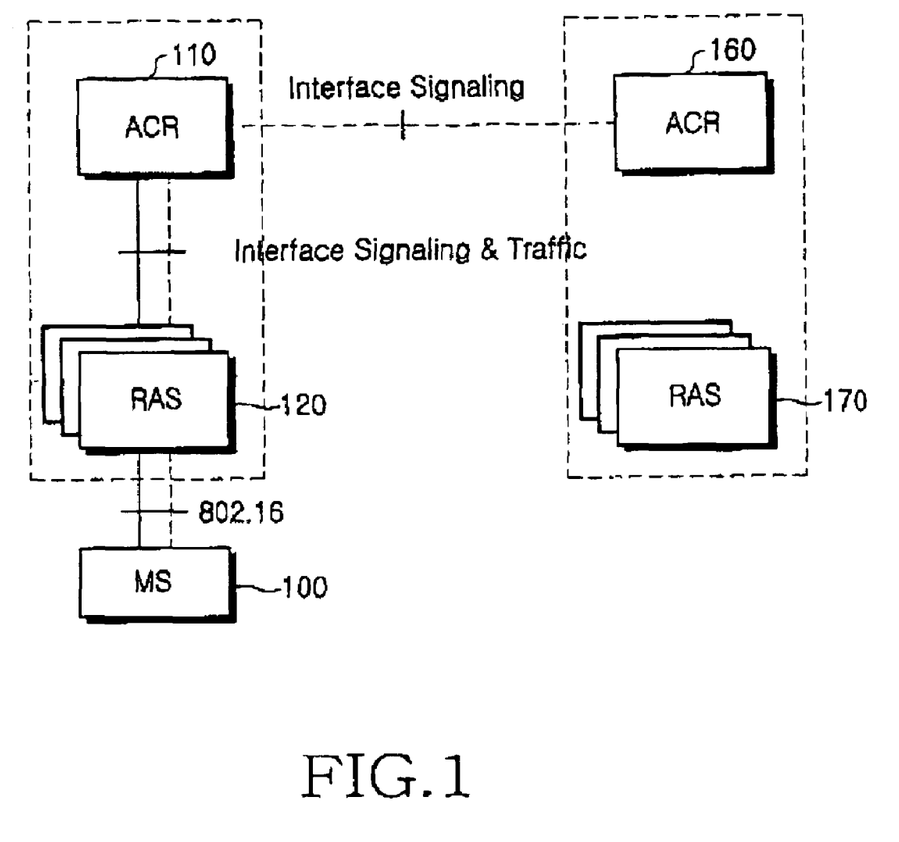
FIG. 1 is a diagram schematically illustrating a configuration of a wireless communication system according to an embodiment of the present invention.

Referring to FIG. 1, a wireless communication system, for example, a WiBro system, includes an MS 100, a plurality of RASs 120 and 170 for performing wireless communication with the MS 100, and a plurality of ACRs 110 and 160 for controlling functions of the RASs 120 and 170.

The ACRs 110 and 160, which are systems interposed between a core network (CN) and the RASs 120 and 170, perform a Convergence Sublayer (CS) function, an Automatic Repeat reQuest (ARQ) processing function, a handover control function, etc. In addition, the ACRs 110 and 160 provide an interface with the CN.

The RASs 120 and 170, which are systems interposed between the ACRs 110 and 160 and the MS 100, provide a wireless access interface based on the wireless access standard, for example, the Institute of Electrical and Electronics Engineers (IEEE) 802.16 standard.

The MS 100, which is an end point of a wireless channel, accesses the RASs 120 and 170 to perform communication with them according to the wireless access standard.

As illustrated in FIG. 1, interfacing between the ACRs 110 and 160 is achieved through interface signaling according to the present invention, for example, interface signaling, and interfacing between the ACR 110 and the RAS 120 is achieved through another interface signaling according to the present invention, for example, interface signaling and traffic.

Figure 2:
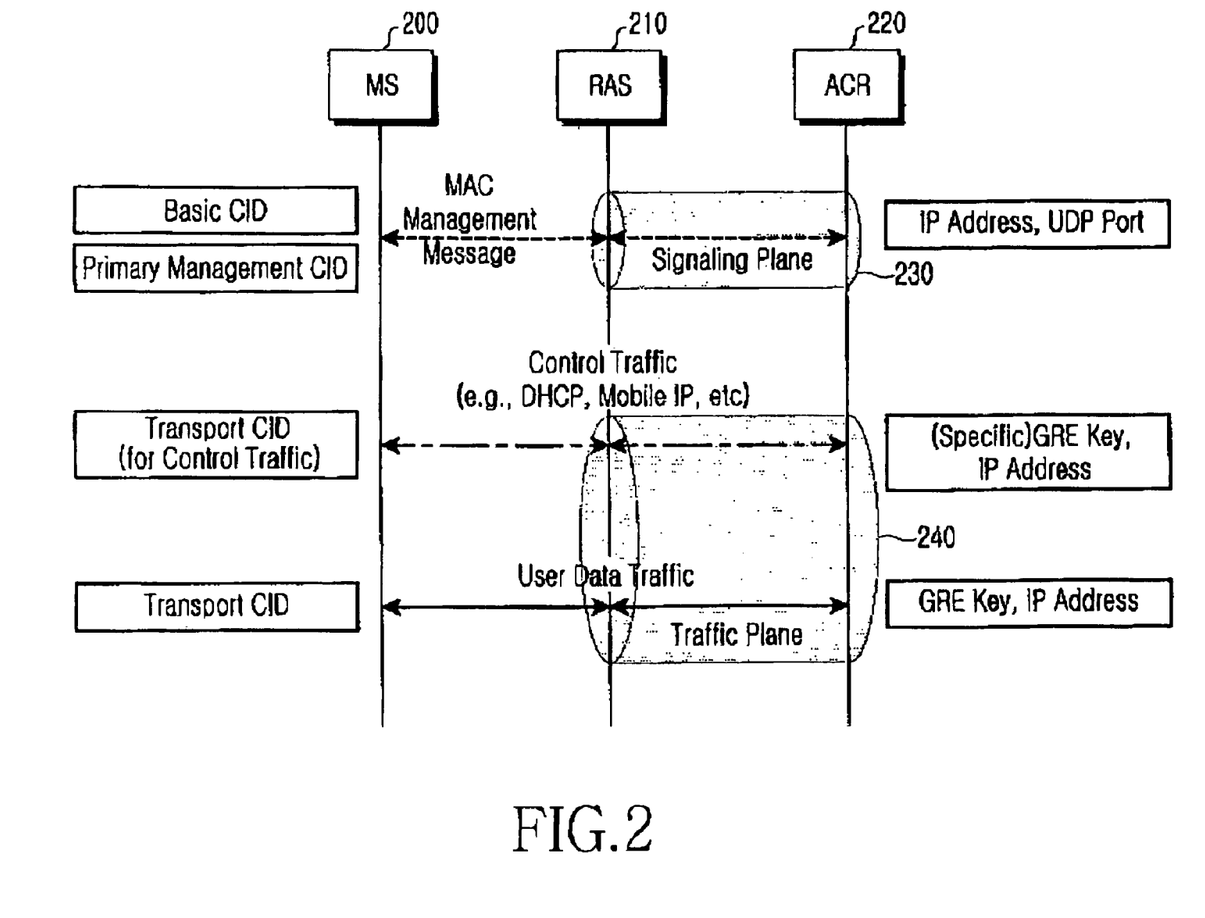
FIG. 2 is a diagram schematically illustrating an exemplary interface structure in a wireless communication system according to an embodiment of the present invention.

FIG. 2 is a diagram schematically illustrating an exemplary interface structure in a wireless communication system according to the present invention.

Referring to FIG. 2, the interface defines a signaling and traffic processing scheme between a RAS 210 and an ACR 220 in a wireless communication system.

A signaling plane 230, for example, an interface signaling plane, defines a session control message necessary between the RAS 210 and the ACR 220, and manages a traffic path, i.e., a Generic Routing Encapsulation (GRE) tunnel, using the session control message. Herein, the session control message corresponds to a Medium Access Control (MAC) Management message.

An operation in the signaling plane will now be described. Upon receiving a Ranging Request (RNG-REQ) message with an Initial Ranging Connection ID (CID), the RAS 210 transmits an interface signaling message using a default Internet Protocol (IP) address/port number of the ACR 220.

Upon receipt of the signaling message, the ACR 220 allocates an IP address/port number for each individual Basic Management CID and Primary Management CID to respond to the signaling message from the RAS 210.

Thereafter, upon receiving a MAC Management message with the Basic Management CID and Primary Management CID, the RAS 210 transports the signaling message using an IP address and User Datagram Protocol (UDP) port number for each individual CID of the ACR 220, determined in an initial ranging process.

An operation in a traffic plane 240 will now be described. As described above, the traffic plane 240 transmits control traffic or user traffic between the RAS 210 and the ACR 220. In addition, the traffic plane 240 performs ARQ control and flow control between the RAS 210 and the ACR 220, and defines a sub-header including additional information necessary for the ARQ and flow control.

The GRE tunnel, which is uniquely generated for each individual service flow, has a format shown in Table 1.

TABLE 1

| C | R | K | S | s | Recur | Flags | Ver | Protocol Type |
|---|---|---|---|---|-------|-------|-----|---------------|
| Checksum (optional) | | | | | | | | Offset (optional) |
| Key (optional) | | | | | | | | |
| Sequence Number (optional) | | | | | | | | |
| Routing: a list of Source Route Entries (optional) | | | | | | | | |

As shown in Table 1, GRE Key is individually allocated for each of an uplink and a downlink, and is transported through an interface between the RAS 210 and the ACR 220, illustrated in FIG. 2. The GRE tunnel is used for generating a virtual link between the RAS 210 and the ACR 220 during handover of an MS 200, and the GRE tunneling protocol has low overhead and has been proven in the existing wireless communication network.

Table 2A and Table 2B show formats of the interface signaling messages transmitted from the signaling plane 230.

TABLE 2A

| Message ID (16) | Message Length (16) |
|-----------------|---------------------|
| ACR Job ID (32) | |

TABLE 2B

| Message ID (16) | Message Length (16) |
|-----------------|---------------------|
| BS ID (48) | |
| RAS Job ID (16) | |

Specifically, Table 2A shows a format of a signaling message for an uplink interface, transmitted from the RAS 210 and the ACR 220, and Table 2B shows a format of a signaling message for a downlink interface, transmitted from the ACR 220 to the RAS 210. Job IDs shown in Table 2A and Table 2B are used in the RAS 210 and the ACR 220 for allocating a unique Job for each MS 200 for session signaling.

The traffic plane 240, for example, an interface traffic plane, transmits control traffic for, for example, Dynamic Host Configuration Protocol (DHCP) and Mobile IP, and user traffic, between the RAS 210 and the ACR 220, performs ARQ control and flow control, and defines a sub-header including additional information necessary for the ARQ control and flow control.

The control traffic for DHCP or Mobile IP is allocated a particular Transport CID, and transported using an IP address and a particular GRE Tunnel Key for control traffic between the RAS 210 and the ACR 220 (hereinafter referred to as a "GRE Tunnel Key for RAS-ACR control traffic").

The user traffic has a Transport CID, and is transported using an IP address and a GRE Tunnel Key for RAS-ACR user traffic.

A description will now be made of embodiments of a handover scheme of the present invention in the HPi system.

Figure 3:
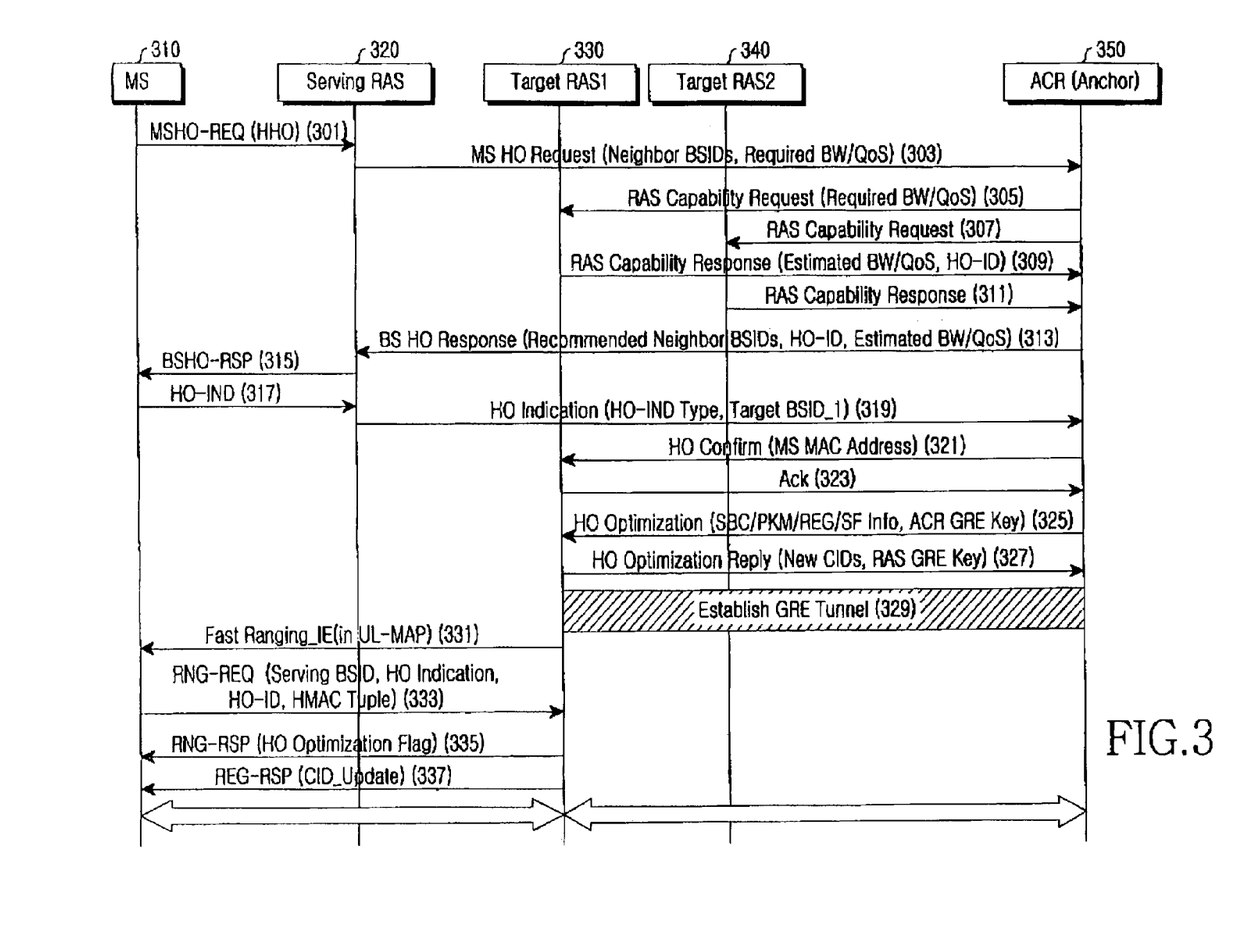
FIG. 3 is a signaling diagram illustrating a hard handover procedure in a wireless communication system according to an embodiment of the present invention.

FIG. 3 is a signaling diagram illustrating a handover procedure in a wireless communication system according to the present invention. In particular, with reference to FIG. 3, a description will now be made of a hard handover method.

Referring to FIG. 3, an MS 310 transmits to a serving RAS 320 a Handover Request (HO-REQ) message including a Neighbor BSID and handover-related parameters to request handover in step 301 Then the serving RAS 320 transmits to a current serving ACR (or anchor point) 350 an MS Handover Request message including the parameters of the HO-REQ message received from the MS 310 in step 303.

An exemplary format of the MS Handover Request message according to the present invention is shown in Table 3.

TABLE 3

| Name | Size | Description |
|---|---|---|
| Message ID | 16 | |
| Message Length | 16 | |
| ACR Job ID | 32 | |
| MSHO-REQ message | variable | Include MSHO-REQ MAC Management message (see 6.3.2.3.53 section in IEEE 802.16e/D12 spec) |

As shown in Table 3, the MS Handover Request message according to the present invention includes a Message ID field, a Message Length field, an ACR Job ID field, and an MSHO-REQ message field. The MSHO-REQ message field includes an MSHO-REQ MAC Management message. As described above, the MS Handover Request message has the parameters included in the HO-REQ message transmitted by the MS 310. Therefore, it can be noted that a Neighbor BSID is added to the MS Handover Request message in response to a handover request.

Upon receiving the MS Handover Request message from the serving RAS 320, the ACR 350 checks target RASs, for example, a target RAS#1 330 and a target RAS#2 340, in a Neighbor BS set included in the received MS Handover Request message. Thereafter, the ACR 350 transmits a RAS Capability Request message to each of the target RASs 330 and 340, in steps 305 and 307. An exemplary format of the RAS Capability Request message is shown in Table 4 below.

TABLE 4

| Name | Size | Description | | | |
|---|---|---|---|---|---|
| Message ID | 16 | 0x8302 | | | |
| Message Length | 16 | | | | |
| BS ID | 48 | | | | |
| RAS Job ID | 16 | 0x0000 | | | |
| MS MAC Address | 48 | PSS unique identifier. | | | |
| Up IP Address | 32 | Serving ACR IP Address | | | |
| Up Port Number | 16 | Serving ACR Port Number | | | |
| ACR Job ID | 32 | Serving ACR Job ID | | | |
| MS MAC Version | 8 | | | | |
| Target BS ID | 48 | | | | |
| Received Frame | 24 | The Frame Number in which the RAS received the PSSHO - REQ from PSS | | | |
| Estimated HO Start | 8 | In frames, Estimated number of frames by PSS starting from the frame following the reception of the PSSHO - REQ message until the handover may take place. | | | |
| Required BW | 8 | Bandwidth which is required by PSS (to guarantee minimum packet data transmission) | | | |
| N_SFID | 8 | | | | |
| | | | Type | Length | Value |
| UL/DL Service Flow [145/146]_ | For(i=0; i<N_SFID; i++){ SFID | | 1 | 4 | 1 - 4294967295 |
| | Service Class Name | | 3 | 2~128 | Null - terminated string of ASCII characters. The length of the string, including null - terminator may not exceed 128 bytes |
| | QoS Parameter Set Type | | 5 | 1 | |
| | Traffic Priority | | 6 | 1 | |
| | Maximum Sustained Traffic Rate | | 7 | 4 | in bits/second |
| | Maximum Traffic Burst | | 8 | 4 | in Bytes |
| | Minimum Reserved Traffic Rate | | 9 | 4 | in bits/second |
| | Minimum Tolerable Traffic Rate | | 10 | 4 | in bits/second |
| | Service Flow Scheduling Type | | 11 | 1 | |
| | Request/Transmission Policy | | 12 | 1 | |
| | Tolerated Jitter | | 13 | 4 | ms |
| | Maximum Latency | | 14 | 4 | ms |
| | Fixed - length versus Variable - length SDU Indicator | | 15 | 1 | |
| | SDU Size | | 16 | 1 | |
| | Global Service Class Name | | rr | 6 | |
| | Type of Data Delivery Services | | 29 | 1 | |
| | SDU Inter - arrival Interval | | 30 | 2 | |
| | Time Base | | 31 | 2 | |
| | Paging Preference | | 32 | 1 | |
| | } | | | | |

As shown in Table 4, the RAS Capability Request message is transported by the ACR 350 to the target RASs 330 and 340 in the list requested by the MS 310, to determine whether handover of a particular MS 310 is acceptable in the target RASs 330 and 340. In Table 4, the RAS Capability Request message includes a Required BW field as a parameter used for requesting acceptability information of the handover.

Then the target RASs 330 and 340 each transmit to the ACR 350 a RAS Capability Response message including the parameter result value requested by the ACR 350 in steps 309 and 311. An exemplary format of the RAS Capability Response message is shown in Table 5 below.

TABLE 5

| Name | Size | Description |
| --- | --- | --- |
| Message ID | 16 | 0x8303 |
| Message Length | 16 | |
| ACR Job ID | 32 | 0x00000000~0xFFFFFFFE |
| MS MAC Address | 48 | PSS unique identifier. |
| Mode | | 0 = HHO request |
| | | 1 = SHO/FBSS request: Anchor BS update with CID update |
| | | 2 = SHO/FBSS request: Anchor BS update without CID update |
| | | 3 = SHO/FBSS request: Active Set update with CID update |
| | | 4 = SHO/FBSS request: Active Set update without CID update |
| | | 5~7 = reserved |
| | | 8~255 = not used |
| If (Mode == 3) { | | For collecting CID information within Active BS Set |
|   CID Update | | |
| } | | |
| Service Level Prediction | 8 | |
| BW Estimated | 8 | Bandwidth which is provided by RAS (to guarantee minimum packet data transmission) |
| QoS Estimated | 8 | Quality of Service Level - UGS, rtPS, nrtPS, BE |

As shown in Table 5, the RAS Capability Response message includes, for example, an Estimated BW field and a Service Level Prediction field as the parameter result value requested by the ACR 350.

Next, upon receiving the RAS Capability Response messages from the target RASs 330 and 340, the ACR 350 transmits to the serving RAS 320 in step 313 a Base Station (BS) Handover Response (BS HO Response) message including Recommended Neighbor BSIDs, Handover ID (HO-ID), and such parameters as Estimated BW and Quality-of-Service (QoS) result value. An exemplary format of the BS Handover Response message is shown in Table 6.

TABLE 6

| Name | Size | Description |
| --- | --- | --- |
| Message ID | 16 | |
| Message Length | 16 | |
| BS ID | 48 | e.g., Operator ID + ACR-ID + RAS-ID |
| RAS Job ID | 16 | |
| BSHO-RSP message | variable | Include BSHO-RSP MAC Management message (see 6.3.2.3.54 section in IEEE 802.16e/D12 spec) |

As shown in Table 6, the BS Handover Response message according to the present invention includes a Message ID field, a Message Length field, a BSID field, a RAS Job ID field and a BSHO-RSP message field. The BSID includes Operator ID, ACR-ID and RAS-ID. The BSHO-RSP message field includes a BSHO-RSP MAC Management message.

Thereafter, the serving RAS 320 transmits to the MS 310 a BSHO-RSP message including the parameter of the BS Handover Response message received from the ACR 350 in step 315.

The MS 310 transmits to the serving RAS 320 in step 317 a Handover Indication (HO-IND) message including Handover Indication Type (HO-IND Type) and Target BSID, to finally indicate that it performs handover. In response, the serving RAS 320 transmits a HO Indication message with the HO-IND Type and the Target BSID to the ACR 350 in step 319. An exemplary format of the HO Indication message is shown in Table 7.

TABLE 7

| Name | Size | Description |
| --- | --- | --- |
| Message ID | 16 | |
| Message Length | 16 | |
| ACR Job ID | 32 | |
| HO-IND message | variable | Include HO-IND MAC Management message (see 6.3.2.3.55 section in IEEE 802.16e/D12 spec) |

As shown in Table 7, the HO Indication message according to the present invention includes a Message ID field, a Message Length field, an ACR Job ID field and a HO-IND message field. The HO-IND message field includes an HO-IND MAC Management message. The HO Indication message is transported to the ACR 350 to indicate approval/denial for handover of a particular MS 310. If HO-IND Type of the HO Indication message is set to 'Serving BS release', the ACR 350 releases MS-related information.

Upon receiving the HO Indication message from the serving RAS 320, the ACR 350 transmits in step 321 a HO Confirm message with an MS MAC address to a target RAS, for example, the target RAS#1 330, included in the HO Indication message. An exemplary format of the HO Confirm message is shown in Table 8 below.

TABLE 8

| Name | Size | Description |
| --- | --- | --- |
| Message ID | 16 | 0x8306 |
| Message Length | 16 | |

TABLE 8-continued

| Name | Size | Description |
|---|---|---|
| BS ID | 48 | |
| RAS Job ID | 16 | 0x0000 |
| MS MAC Address | 48 | PSS unique identifier. |
| ACR Job ID | 32 | |
| MS MAC Version | 8 | |
| Serving RAS - ID | 48 | |
| Frame Information | 32 | In frames #0~#23: the Frame Number in which the RAS received the PSSHO - REQ from PSS #24~#31: Estimated number of frame by PSS starting from the frame following the reception of the PSSHO - REQ message until the handover may take place |

As shown in Table 8, the HO Confirm message is transported to a target RAS, for example, the target RAS#1 330, by the ACR 350 to indicate approval for the handover of the particular MS 310.

Upon receiving the HO Indication message from the ACR 350, the target RAS#1 330 transmits an Ack message to the ACR 350 in response thereto in step 323.

Upon receiving the Ack message, the ACR 350 transmits to the target RAS#1 330 in step 325 an HO Optimization message including MS information necessary for performing optimized HO, for example, Subscriber Station's Basic Capability Negotiation (SBC) information, Privacy Key Management (PKM) information, Registration (REG) information and Provisioned Service Flow (Provisioned SF) information, and also including an ACR GRE Key used for establishing a GRE tunnel. An exemplary format of the HO Optimization message is shown in Table 9 below.

TABLE 9

| Name | Size (bit) | Description |
|---|---|---|
| Message ID | 16 | |
| Message Length | 16 | |
| BS ID | 48 | |
| RAS Job ID | 16 | 0x0001 ~0xFFFF |
| Num_Tunnels | | GRE Tunnel for assigned CID |
| For(I=0; I<Num_Tunnels;I++) { | | |
|   CID | | |
|   New GRE Key | | |
|   New IP Address | | |
| } | | |

| | | Type | Length | Value |
|---|---|---|---|---|
| SBC Information | | | | |
| | | | | |
| SS Management Support | | 2 | 1 | |
| Bandwidth Allocation Support | | 1 | 1 | |
| MAC PDU Capabilities | | 4 | 1 | |
| Subscriber Transition Gaps | | 2 | 2 | |
| Maximum Transmit Power | | 3 | 4 | |
| Authorization Policy Support | | 25 | 1 | |
| PKM Version Support | | 26 | 1 | Bit#0: PKM Version 1<br>Bit#1: PKM Version 2<br>Bit#2~7: reserved, shall be set to zero |
| Handoff Supported | | 19 | 1 | Bit #0: SHO/FBSS HO - Single - BS Map Supported<br>Bit #1: SHO/FBSS HO - Multi - BS MAP Supported<br>Bit #2-#7: reserved, shall be set to zero |
| Current Transmit Power | | 147 | 1 | |
| OFDMA SS FFT Sizes | | 150 | 1 | |
| OFDMA SS demodulator | | 151 | 1 | |
| OFDMA SS modulator | | 152 | 1 | |
| The number of HARQ ACK Channel | | 153 | 1 | |
| OFDMA SS Permutation support | | 154 | 1 | |
| OFDMA MAP Capability | | 155 | 1 | |
| Uplink Control Channel Support | | xxx | 1 | |
| OFDMA SS demodulator for MIMO Support | | 155 | 1 | |
| OFDMA SS modulator for MIMO Support | | 156 | 1 | |
| PKM Information | | | | |
| | | | | |
| AUTH - Key | | 7 | 128 | 128 byte quantity representing an RSA - encrypted AK |
| Key Lifetime | | 9 | 4 | 32 - bit quantity representing AK's lifetime<br>A key lifetime of zero indicates that the corresponding AK is not valid. |
| Key Sequence Number | | 10 | 1 | 4 - bit Sequence Number (AK)<br>Each compound SA - Descriptor attribute specifies an SAID and additional properties of the SA. |
| For (i=0; i<Num_SA; i++) { | | | | |
| SA Descriptor | SAID | 12 | 2 | |
| 23_ | SA Type | 24 | 1 | |
| | Cryptographic Suite | 20 | 3 | |
| } | | | | |

TABLE 9-continued

| | | | | |
|---|---|---|---|---|
| PKM Config Settings 27_ | Authorize Wait Timeout | 1 | 4 | in seconds |
| | Reauthorize Wait Timeout | 2 | 4 | in seconds |
| | Authorization Grace Time | 3 | 4 | in seconds |
| | Operational Wait Timeout | 4 | 4 | in seconds |
| | Rekey Wait Timeout | 5 | 4 | in seconds |
| | TEK Grace Time | 6 | 4 | in seconds |
| | Authorize Reject Wait Timeout | 7 | 4 | in seconds |
| REG Information | | | | |
| SS Management Support | | 2 | 1 | |
| IP Management Mode | | 3 | 1 | |
| IP Version | | 4 | 1 | |
| Number of UL CID Support | | 6 | 2 | Number of Uplink CIDs the SS can support |
| Number of DL CID Support | | X | 2 | Number of Downlink CIDs the SS can support |
| Classification/PHS Options and SDU Encapsulation Support | | 7 | 2 | |
| Maximum Number of Classifier | | 8 | 2 | |
| PHS Support | | 9 | 2 | |
| ARQ Support | | 10 | 1 | |
| DSx Flow Control | | 11 | 1 | |
| MAC CRC Support | | 12 | 1 | |
| PKM Flow Control | | 15 | 1 | |
| Maximum Number of Supported Security Associations | | 17 | 1 | |
| SA Update 20_ | Old SAID | 1 | 2 | |
| | New SAID | 2 | 2 | |
| | New SA type | 3 | 1 | |
| | New Cryptographic suite | 4 | 4 | |
| Method for Allocating IP Address | | 23 | 1 | |
| Mobility Parameters Support 24_ | Mobility Features Supported | 18 | 1 | Bit #0: Mobility (handover) support<br>Bit #1: Sleep - mode support<br>Bit #2: Idle - mode support |
| | SKIP - ADDR - ACQUISITION | 11 | 1 | 0: No IP address change<br>1: Re - acquire IP address |
| System Resource Retain Time | | 50 | 1 | multiple of 100 ms<br>200 msec is recommended as default |
| SS Mode Selection Feedback Support | | 20 | 1 | |
| Packing Support | | 51 | 1 | |
| Vender Specific Information 143_ | Vender ID | 144 | 3 | |
| Provisioned SF Information | | | | |
| Old CID reserved | | | | For Provisioned SF |

As shown in Table 9, the HO Optimization message is transmitted to a corresponding target RAS, for example, the target RAS#1 330, along with BSC information, PKM information, REG information and Provisioned SF information for the MS 310, and GRE tunnel information with the target RAS#1 330, all of which are requested in a handover signaling process.

The target RAS#1 330 transmits to the ACR 350 in step 327 an HO Optimization Reply message including New CIDs for New Basic CID & Primary Management CID and Old Provisioned SF and also including a GRE Key used for establishing a corresponding GRE tunnel. An exemplary format of the HO Optimization Reply message is shown in Table 10 below.

TABLE 10

| Name | Size (bit) | Description |
|---|---|---|
| Message ID | 16 | |
| Message Length | 16 | |
| ACR Job ID | 32 | 0x00000000~0xFFFFFFFE |
| Num_Tunnels | | GRE Tunnel for assigned |
| For(I=0; I<Num_Tunnels;I++) {<br>  CID<br>  New GRE Key<br>  New IP Address<br>} | CID | |

After the transmission/reception of the HO Optimization message between the ACR 350 and the target RAS#1 330 is completed, a ORE tunnel is established between the ACR 350 and the target RAS#1 330 in step 329. Specifically, the handover signaling procedure previously generates a GRE tunnel to the target RAS#1 330, so the MS 310 can reduce a delay time required after a ranging procedure to the target RAS#1 330. In this manner, the present invention can provide faster handover. In addition, as the ACR 350 provides the target RAS#1 330 with the SBC information, PKM information, REG information and Provisioned SF information stored in the former serving RAS 320, the MS 310 can omit the additional procedure for SBC, PKM, REG and Dynamic Service Addition (DSA) after the ranging procedure to the target RAS#1 330. This optimized handover technique can meet various requirements for services by establishing a tunnel for each individual service flow.

Thereafter, the target RAS#1 330 transmits an uplink MAP (UL-MAP) message with a fast ranging information element (Fast_Ranging_IE) to the MS 310 in step 331. In response, the MS 310 transmits to the target RAS#1 330 in step 333 a Ranging Request (RNG-REQ) message including MAC address, Serving BSID, HO Indication and HO-ID In response to the RNG-REQ message, the target RAS#1 330 transmits a Ranging Response (RNG-RSP) message with a HO Process Optimization Flag to the MS 310 in step 335. At this moment, the target RAS#1 330 determines whether to perform the SBC, PKM, REG and DSA processes according to a bit value set in the HO Process Optimization Flag. In addition, the target RAS#1 330 transmits a Registration Response (REG-RSP) message with CID_Update and SAID_Update to the MS 310 in step 337, to reestablish a relation to the former Provisioned SF.

The hard handover method in the wireless communication system according to the present invention has been described thus far. A description will now be made of a Fast BS Switch (FBSS) handover method in a wireless communication system according to the present invention.

Figure 4:
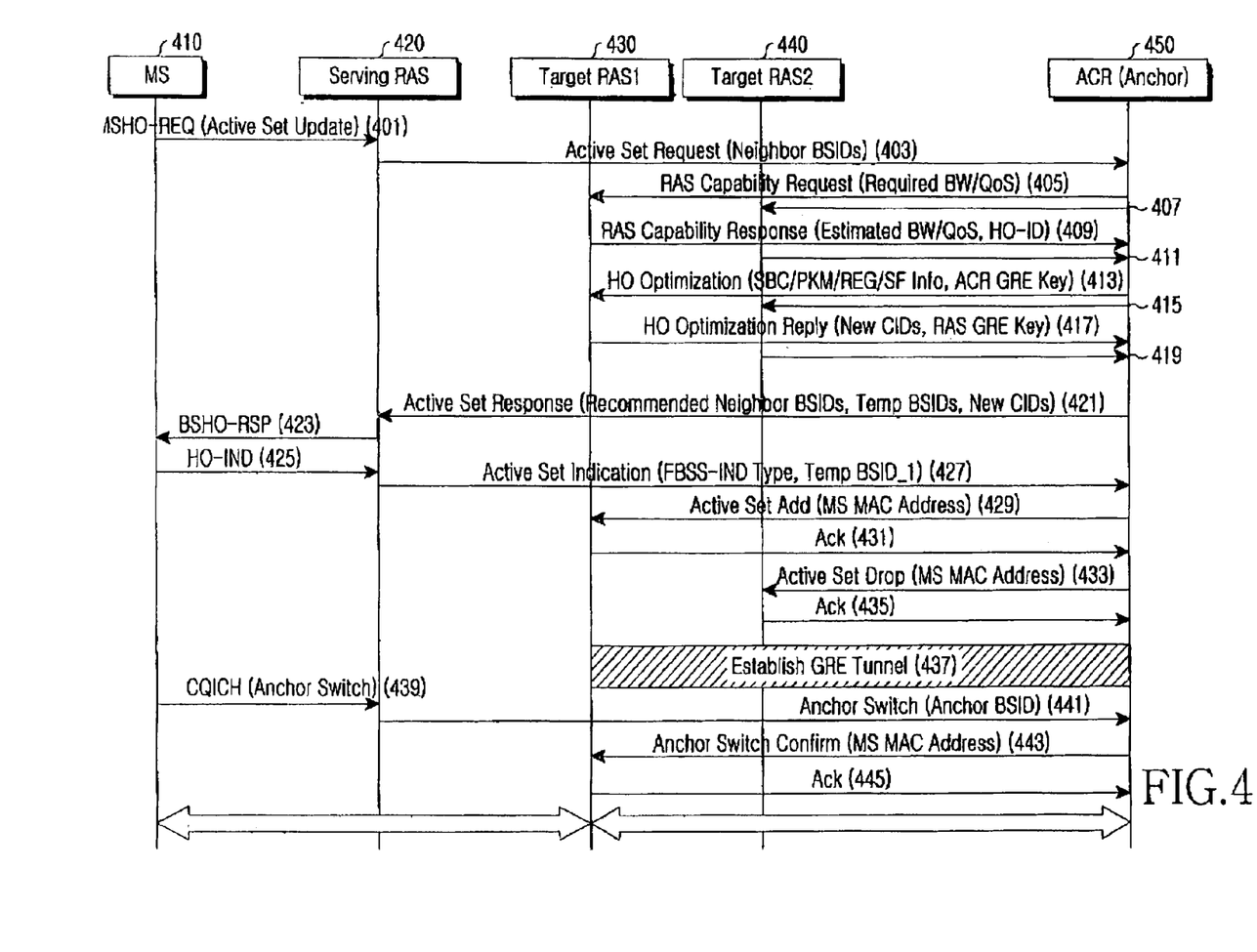
FIG. 4 is a signaling diagram illustrating an FBSS handover procedure in a wireless communication system according to an embodiment of the present invention.

FIG. 4 is a signaling diagram illustrating a handover procedure in a wireless communication system according to the present invention. In particular, with reference to FIG. 4, a description will now be made of an FBSS handover method.

Referring to FIG. 4, an MS 410 transmits to a serving RAS 420 a HO-REQ message including a Neighbor BSID and handover-related parameters to request Active Set Update in step 401. Then the serving RAS 420 transmits to a current serving ACR (or anchor point) 450 an Active Set Request message including the parameters of the HO-REQ message received from the MS 410 in step 403.

Although the Active Set Request message according to the present invention is similar in format to the MS Handover Request message shown in Table 3, a set value of an Arrival Time Difference Indication field is subject to change.

Upon receiving the Active Set Request message from the serving RAS 420, the ACR 450 checks target RASs, for example, a target RAS#1 430 and a target RAS#2 440, in a Neighbor BS set included in the received Active Set Request message. Thereafter, the ACR 450 transmits a RAS Capability Request message to each of the target RASs 430 and 440 in step 405 and 407. An exemplary format of the RAS Capability Request message is shown above in Table 4A and Table 4B.

The target RASs 430 and 440 each transmit to the ACR 450 a RAS Capability Response message including a parameter result value requested by the ACR 450 and an HO-ID in steps 409 and 411. An exemplary format of the RAS Capability Response message is shown above in Table 5.

Thereafter, the ACR 450 transmits to each of the target RASs 430 and 440 an HO Optimization message including SBC information, PKM information, REG information and Provisioned SF information necessary for performing Optimized HO and also including an ACR GRE Key used for establishing a GRE tunnel, in steps 413 and 415. An exemplary format of the HO Optimization message is shown above in Table 9.

The target RASs 430 and 440 each transmit to the ACR 450 an HO Optimization Reply message including New CIDs for new Basic CID & Primary Management CID and Old Provisioned SF and also including a GRE Key used for establishing a corresponding GRE tunnel, in steps 417 and 419. An exemplary format of the HO Optimization Reply message is shown above in Table 10.

Upon receiving the HO Optimization Reply messages from the target RASs 430 and 440, the ACR 450 transmits an Active Set Response message including Recommended Neighbor BSIDs, Temp BSIDs and New CIDs to the Serving RAS 420 in step 421. An exemplary format of the Active Set Response message is shown above in Table 6.

The serving RAS 420 transmits a BS Handover Response (BSHO-RSP) message including the parameters of the Active Set Response message received from the ACR 450 to the MS 410 in step 423.

The MS 410 transmits a HO-IND message including FBSS-IND Type and Temp BSID to the serving RAS 420 in step 425, to finally indicate that it will perform Active Set Update. Then the serving RAS 420 transmits an Active Set Indication message including the FBSS-IND Type and Temp BSID to the ACR 450 in step 427. An exemplary format of the Active Set Indication message is shown above in Table 7.

Upon receiving the Active Set Indication message from the serving RAS 420, the ACR 450 transmits an Active Set Add message with an MS MAC address to the target RAS#1 430 in step 429, to add a target RAS, for example, the target RAS#1 430, included in the received Active Set Indication message to its Active Set. An exemplary format of the Active Set Add message is shown in Table 11 below.

TABLE 11

| Name | Size | Description |
| --- | --- | --- |
| Message ID | 16 | |
| Message Length | 16 | |
| ACR Job ID | 32 | 0x00000000~0xFFFFFFFE |
| MS MAC Address | | |
| Reserved | | |

Upon receiving the Active Set Add message from the ACR 450, the target RAS#1 430 transmits an Ack message to the ACR 450 in response thereto in step 431.

Thereafter, the ACR 450 transmits an Active Set Drop message with an MS MAC address to the target RAS#2 440 in step 433, to drop the target RAS#2 440 from the Active Set. An exemplary format of the Active Set Drop message is shown above in Table 10.

Upon receiving the Active Set Drop message from the ACR 450, the target RAS#2 440 transmits an Ack message to the ACR 450 in response thereto in step 435.

After the transmission/reception of the Active Set Add/Drop messages between the ACR 450 and the target RASs 430 and 440 is completed, a GRE tunnel is established between the ACR 450 and the target RAS#1 430 in step 437. That is, the HO signaling procedure according to the present invention previously generates a GRE tunnel to the target RAS#1 430, so the MS 410 can reduce a delay time required for an access to the target RAS#1 430. In this manner, the present invention can provide faster handover. In addition, as the ACR 450 provides the target RAS#1 430 with the SBC information, PKM information, REG information and Provisioned SF information stored in the old serving RAS 420, the MS 410 can omit the additional procedure for SBC, PKM, REG and DSA after the access to the target RAS#1 430. This optimized handover technique can meet various requirements for services by establishing a tunnel for each individual service flow.

Thereafter, the MS 410 sends an Anchor BS Switching request over a Channel Quality Information (CQI) channel (CQICH) in step 439, to request FBSS handover to the target RAS#1 430. Upon receiving an Anchor BS Report (codeword) from the MS 410 over a CQICH, the serving RAS 420 transmits an Anchor Switching Indication message to the ACR 450 in step 441, to request switching to the target RAS#1 430 which is a designated Anchor. As a result, the MS 410 does not perform a separate ranging process. An exemplary format of the Anchor Switching Indication message is shown in Table 12 below.

TABLE 12

| Name | Size | Description |
| --- | --- | --- |
| Message ID | 16 | |
| Message Length | 16 | |
| ACR Job ID | 32 | 0x00000000~0xFFFFFFFE |
| MS MAC Address | | |
| FBSS_IND_Type | 8 | 0b00: confirm Anchor BS update |
| | | 0b01: Anchor BS update cancel |
| | | 0b10: Anchor BS update reject |
| | | 0b11: reserved |
| If (FBSS_IND_Type == 0b00){ | | |
|   Anchor BS - ID | 8 | TEMP_BS_ID of the Anchor BS |
|   Action Time | 8 | Action time when the Anchor BS shall be updated |
| } | | |

As shown in Table 12, the Anchor Switching Indication message is transported from the serving RAS 420 to the ACR 450 to indicate approval/denial for FBSS of a particular MS 410 for Anchor BS Switching.

Upon receiving the Anchor Switching Indication message from the serving RAS 420, the ACR 450 transmits to the target RAS#1 430 in step 443 an Anchor Switch Confirm message indicating success in Anchor Switching to the target RAS#1 430. Then the target RAS#1 430 transmits in step 445 an Ack message to the ACR 450 in response to the Anchor Switch Confirm message received from the ACR 450. An exemplary format of the Anchor Switch Confirm message is shown in Table 13 below.

TABLE 13

| Name | Size | Description |
| --- | --- | --- |
| Message ID | 16 | |
| Message Length | 16 | |
| ACR Job ID | 32 | 0x00000000~0xFFFFFFFE |
| MS MAC Address | | |
| Reserved | | |

As can be understood from the foregoing description, the present invention provides normalized messages for a handover signaling scheme between a RAS (or BS) and an ACR (or BSC) to provide optimized handover in a wireless communication system, and a method for providing the same. In the handover signaling process, once a target RAS is determined, session information is previously transported to the determined target RAS. As a result, in a network re-entry process, an MS can minimize signaling overhead between the RAS and the ACR, and also minimize a handover delay time.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A handover method in a wireless communication system, comprising the steps of:

transmitting, by a serving base station, a handover request message to a base station controller in response to a handover request of a mobile station;

determining, by the base station controller, target base stations to which the mobile station can perform handover among target base stations in a list of neighbor base stations, and transmitting a handover response message including the determination result information to the mobile station via the serving base station;

determining, by the mobile station, a target base station to which it will perform handover, and transmitting a message indicating that it will perform handover, to the base station controller via the serving base station;

transmitting, by the base station controller, a confirm message indicating that the mobile station will perform handover, to the determined target base station, and establishing a tunnel to the target base station; and registering, by the mobile station, itself in the target base station.

2. The handover method of claim 1, wherein the handover request message includes message identifier (ID) information, message length information, base station controller's job ID information and handover request information, and the handover request information includes parameters included in the handover request message transmitted by the mobile station and neighbor base station identifier (Neighbor BSID) information determined in response to the handover request.

3. The handover method of claim 1, wherein the step of determining target base stations to which the mobile station can perform handover comprises determining, by the base station controller, whether each of the neighbor base stations can accept handover of the mobile station thereto, and transmitting a handover response message including IDs of the base stations to which the mobile station can perform handover, to the serving base station.

4. The handover method of claim 3, wherein the step of determining whether each of the neighbor base stations can accept handover of the mobile station thereto comprises the step of transmitting, by the base station controller, a base station capability request message to the target base stations and determining whether each of the target base stations can accept handover of the mobile station thereto, based on a base station capability response message received in response to the base station capability request message.

5. The handover method of claim 4, wherein the base station capability request message includes a required bandwidth field used for requesting acceptability information of handover as a message transmitted to target base stations in a neighbor base station list requested by the mobile station, to determine whether handover of a particular mobile station is acceptable.

6. The handover method of claim 4, wherein the base station capability response message includes parameter information requested by the base station controller, and the parameter information includes estimated bandwidth information and service level prediction information.

7. The handover method of claim 1, wherein the step of transmitting by the mobile station a message indicating that it will perform handover comprises transmitting to the serving base station a handover indication message including a handover indication type field used for indicating that the mobile station will perform handover, and an ID of a target base station.

8. The handover method of claim 7, wherein the handover indication message includes message ID information, message length information, base station controller's job ID information and handover indication information, and the handover indication information includes information used for informing the base station controller of approval/denial for handover of the mobile station.

9. The handover method of claim 1, wherein the step of transmitting by the base station controller a confirm message indicating that the mobile station will perform handover comprises, upon receiving a handover indication message from the serving base station, transmitting a handover confirm message to a target base station included in the handover indication message;

wherein the handover confirm message includes information used by the base station controller to inform the target base station that the mobile station will perform handover thereto.

10. The handover method of claim 1, wherein the tunnel establishing step comprises:

upon receiving a response from the target base station, transmitting, by the base station controller, a handover optimization message including information necessary for performing optimized handover and information for tunnel establishment, to the target base station;

transmitting, by the target base station, a handover optimization reply message including a new connection ID (CID) and tunnel key information used for establishing a corresponding tunnel, to the base station controller; and after transmitting/receiving the handover optimization message and the handover optimization reply message, establishing a tunnel between the base station controller and the base station.

11. The handover method of claim 10, wherein the handover optimization message includes subscriber station's basic capability negotiation (SBC) information, privacy key management (PKM) information, registration (REG) information, provisioned service flow (Provisioned SF) information, and information on a tunnel to the target base station for the mobile station, requested in a handover signaling process.

12. The handover method of claim 1, wherein the registration step comprises:

transmitting, by the target base station, an uplink MAP message including a fast ranging information element (Fast_Ranging_IE) to the mobile station;

transmitting, by the mobile station, a ranging request message to the target base station;

transmitting, by the target base station, a ranging response message including a handover process optimization flag to the mobile station; and transmitting, by the target base station, a registration response message to the mobile station.

13. A handover method in a wireless communication system, comprising the steps of:

upon receiving an active set request message, exchanging with target base stations, by a base station controller, information used for determining whether each of the target base stations can accept handover of a mobile station thereto and connection information for the target base stations;

transmitting, by the base station controller, an active set response message including identifiers (IDs) of base stations to which the mobile station can perform, to a serving base station;

upon receiving a handover indication message from the mobile station, transmitting, by the serving base station, an active set indication message to the base station controller;

after exchanging an active set add/drop message with the target base stations, establishing, by the base station controller, a tunnel between the base station controller and the target base station;

upon receiving an anchor base station report over a channel quality information channel (CQICH), transmitting by the serving base station an anchor switching indication message to the base station controller; and upon receiving an anchor switch confirm message from the base station controller, performing communication by the target base station without performing a ranging procedure with the mobile station.

14. The handover method of claim 13, wherein the step of determining whether each of the target base stations can accept handover of the mobile station thereto comprises transmitting a base station capability request message to the target base stations and determining whether each of the target base stations can accept handover of the mobile station thereto, based on a base station capability response message received in response to the base station capability request message.

15. The handover method of claim 13, wherein the step of exchanging connection information with the target base stations comprises:

upon receiving a response from the target base station, transmitting by the base station controller a handover optimization message including information necessary for performing optimized handover and information used for tunnel establishment, to the target base station; and transmitting by the target base station a handover optimization reply message including a new connection ID (CID) and tunnel key information used for establishing a corresponding tunnel.

16. The handover method of claim 13, wherein the active set indication message includes fast base station switch (FBSS) indication type information and temporary base station ID (Temp BSID) information.

17. The handover method of claim 13, wherein the active set add/drop message includes a mobile station (MS) medium access control (MAC) address to add or drop target base stations included in the active set indication message to/from an active set.

18. The handover method of claim 13, further comprising sending, by the mobile station, a request for anchor base station switching over the CQICH to request FBSS handover to the determined target base station.

19. The handover method of claim 13, wherein the anchor switching indication message includes information used by the serving base station to inform the base station controller that it approves/denies FBSS of the mobile station for anchor base station switching.

20. The handover method of claim 13, further comprising, upon receiving the anchor switching indication message from the serving base station, transmitting by the base station controller an anchor switch confirm message indicating success in anchor switching to the target base station.

* * * * *